United States Patent [19]

Bansal et al.

[11] Patent Number: 4,780,659
[45] Date of Patent: Oct. 25, 1988

[54] HIGH-POWER, HIGH-VOLTAGE DIRECT CURRENT POWER SOURCE

[75] Inventors: Madan L. Bansal; Alexander Krinickas, Jr., both of Rockford, Ill.

[73] Assignee: Sundstrand Corporation, Rockford, Ill.

[21] Appl. No.: 33,395

[22] Filed: Apr. 1, 1987

[51] Int. Cl.$^4$ ............................. H02P 9/00; H02J 1/02
[52] U.S. Cl. .......................................... 322/58; 307/82; 307/84; 310/114; 322/90
[58] Field of Search ..................... 322/58, 86, 89, 90, 322/28; 307/82, 83, 84; 318/199; 310/114

[56] References Cited

U.S. PATENT DOCUMENTS

| | | | |
|---|---|---|---|
| 2,945,141 | 7/1960 | Van de Graaff et al. | 322/63 X |
| 3,340,448 | 9/1967 | Thiessen | 322/90 X |
| 3,421,071 | 1/1969 | Cassel | 322/9 X |
| 3,459,980 | 8/1969 | Coroller | 310/114 |
| 3,558,904 | 1/1971 | Kanngiesser | 307/84 X |
| 3,784,894 | 1/1974 | Silvertown | 322/90 X |
| 4,339,704 | 7/1982 | McSparran et al. | 322/90 |
| 4,663,581 | 5/1987 | Glennon | 310/114 X |

Primary Examiner—R. J. Hickey
Attorney, Agent, or Firm—Wood, Dalton, Phillips, Mason & Rowe

[57] ABSTRACT

A high-power, high-voltage DC power supply includes a plurality of AC generators, each of which includes a rotor and one or more sets of armature windings wherein the rotors are linked together. A plurality of rectifiers are connected together in series and the armature windings are connected to the rectifiers such that each rectifier produces a fractional voltage which is combined with the fractional voltage developed by other rectifiers to develop a combined output voltage across all of the rectifiers. The armature windings are placed relative to one another such that a plurality of equally-spaced ripple peaks appear in the combined output voltage for each 360° of each armature winding voltage. This in turn minimizes ripple magnitude leading to a desirable decrease in the overall power supply size and weight.

8 Claims, 2 Drawing Sheets

HIGH-POWER, HIGH-VOLTAGE DIRECT CURRENT POWER SOURCE

DESCRIPTION

1. Technical Field

The present invention relates generally to DC power supplies, and more particularly to a DC power supply which develops high power levels at a high voltage with low ripple content.

2. Background of the Invention

In certain applications there is a need for DC electric power in the multi-megawatt range at high voltages with low ripple content. For example, power levels on the order of 50 megawatts at voltages of 100 kilovolts or more may be specified with voltage ripple not in excess of 1.0%. In the past, high-power, high-voltage DC generating systems capable of such extreme levels have typically included an AC generator, a high-power rectifier for converting the output of the AC generator into DC power and a filter for smoothing the rectified output. The required high voltages developed by the generator necessitate the use of a very heavy insulating system. Also, the nature of the rectification process results in high ripple magnitudes which can only be brought within specifications by large and heavy filters. The insulation and filter requirements greatly increase the size and weight of the system and may render same unusable in situations where these parameters must be held to a minimum, such as in aerospace applications.

The insulation requirements can be reduced by utilizing a high-power voltage step-up transformer between the generator output and the rectifier. This reduces the voltage which must be developed by the generator; however, the transformer itself is large and heavy and hence the size and weight of the overall system can be reduced only marginally as compared with the above-noted system. In addition, the efficiency of the system is reduced by the transformer.

A different type of DC high voltage generator is disclosed in Van de Graaff et al U.S. Pat. No. 2,945,141. This patent discloses in FIG. 2 a plurality of stacked generator units each having a plurality of stator windings disposed at different angular positions within the stator. A common rotor is rotatably disposed with the stators. Each stator winding is apparently connected in series to other stator windings in the same and other generator units by a rectifier to form three sets of interconnected windings, each of which produces a DC voltage. The angular positioning of the stator windings results in an unspecified phase relationship which apparently reduces ripple magnitude.

A direct current transmission system utilizing a plurality of AC generators coupled to series-connected rectifiers is disclosed in Kanngiesser U.S. Pat. No. 3,558,904. The AC output of each generator is connected to primary windings of a polyphase voltage step-up transformer having secondary and tertiary windings. The secondary windings of half the transformers are delta-connected while the secondary windings of the remaining transformers are wye-connected. The voltage outputs of the delta-connected transformer secondaries are therefore shifted in phase by 30° relative to the voltage outputs of the wye-connected transformer secondaries. The secondary windings are connected to the rectifiers which develop DC output power. The tertiary windings are connected together through switches so that full rated voltage can be developed even in the event of a generator failure, albeit at reduced power.

Reduction of DC ripple magnitude has been achieved in other applications. For example, there is disclosed in U.S. patent application Ser. No. 700,449, filed February 11, 1985, entitled "Multiphase DC-DC Series-Resonant Converter", and assigned to the assignee of the present patent application a DC-DC converter comprising a plurality of N sine-wave resonant DC-DC subconverters each including a resonant DC-AC converter which produces intermediate AC power, a transformer connected to the DC-AC converter and a full-wave rectifier connected to the transformer. The rectifiers are connected together in parallel to produce a combined output which is filtered by a filter circuit. The ripple magnitude in the combined output is substantially reduced by operating the DC-AC converters such that a phase displacement of 360/N electrical degrees exists in the intermediate power of successive subconverters. This power converter, however, is not designed for very high power levels, nor can it produce electrical power from mechanical power.

A DC generating system utilizing permanent magnet generators with series-connected stator windings and a common rotor is disclosed in U.S. Pat. No. 4,663,581, filed Oct. 31, 1984, entitled "Voltage Regulated Permanent Magnet Generator System", and assigned to the assignee of the present patent application. The stator windings are connected to a rectifier and filter for producing output DC power. Since the stator windings are connected in series the voltages developed by same are combined in vectorial fashion. Thus, the voltage of the DC output power may be adjusted by varying the angular placement of one stator relative to the other. This generating system, however, is also not designed for high-power, high-voltage operation.

SUMMARY OF INVENTION

The present invention comprises a high-power, high-voltage DC power source which develops low ripple magnitude and which is compact, light in weight and efficient.

More particularly, the DC power source of the present invention includes a plurality of N identical AC generators each of which includes M armature or stator windings. Each of the generators also includes a rotor which develops a magnetic field. The rotors are mechanicaly linked so that they may be rotated together by a prime mover to induce voltages at a fundamental frequency in each of the stator windings. Each stator winding is coupled to one of $N \times M$ series-connected rectifiers such that a fractional DC output voltage is developed by each rectifier and a combined or total DC voltage is developed across all of the rectifiers. Each stator winding is disposed in a predetermined physical relationship with respect to the remaining stator windings in the same and the other generators such that the ripple frequency in the combined or total DC voltage is equal to an integer multiple of the fundamental frequency multiplied by the value of $M \times N$.

In the preferred embodiment, the integer multiple is equal to $P \times Z$, where P equals the number of phases of each generator and where Z equals 1 or 2 depending upon whether the rectifiers are of the half-wave or full-wave type, respectively.

The ripple factor of the combined or total DC output voltage is greatly reduced as a result of the increase in ripple frequency, and hence the output filter size and weight may be reduced substantially or the filter may be dispensed with entirely. Also, the midpoint of the series-connected rectifiers may be connected to ground potential so that the combined DC voltage is centered thereabout. This, in addition to the fact that each generator produces only a portion of the combined or total DC output voltage and power, reduces insulation requirements.

A further consequence of the fact that each generator only develops a fraction of the total output power is that each generator may be operated at a relatively high speed and hence each generator may be reduced in size and weight.

All of the above advantages result in a reduction of the overall size and weight of the DC power source.

BEST MODE FOR CARRYING OUT THE INVENTION

Figure 1:
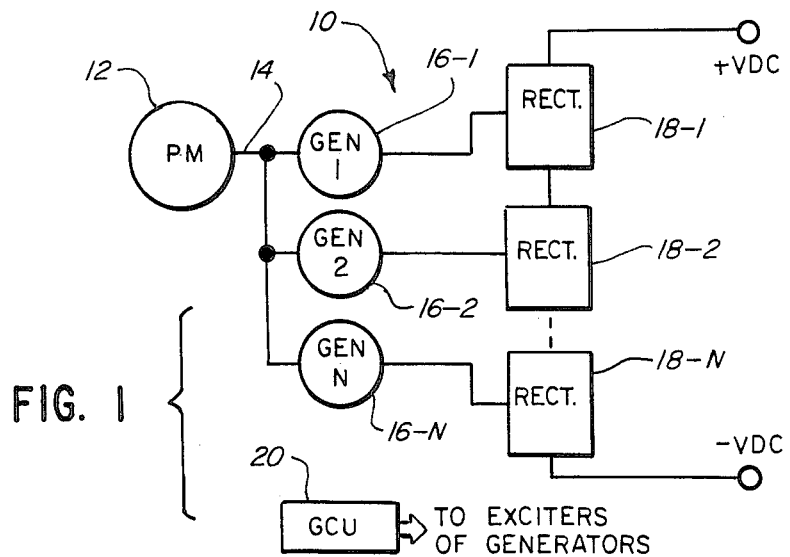
FIG. 1 is a block diagram of a DC power source according to the present invention.

Referring now to FIG. 1, there is illustrated in generalized form a high-power, high-voltage DC generator 10 according to the present invention. The generator 10 is coupled to and receives motive power from a prime mover 12 having an output shaft 14. The shaft 14 is coupled to motive power shafts of N AC generators 16-1, 16-2 . . . 16-N. The motive power shafts are mechanically linked together by gears or by direct connection so that the rotors of the generators 16 rotate together in response to the application of motive power thereto.

In the embodiment illustrated in FIG. 1, each generator is of the single-phase type having a single armature or stator winding. It should be noted that the generators may alternatively be polyphase machines, such as three-phase generators, as noted in greater detail below. Each winding is connected to one of N rectifiers 18-1, 18-2 . . . 18-N. The rectifiers may be of the half-wave or full-wave type, as desired, although as will be later explained, the full-wave type is preferred.

The rectifiers 18-1 through 18-N are connected in series and together develop a combined or total DC output voltage $V_{DC}$. Of particular significance is the fact that each generator 16 and associated rectifier 18 develops only a fraction of the total output voltage $V_{DC}$ and output power.

The generators 16 may be either of the wound-field or permanent magnet type. In the preferred embodiment, each comprises a brushless wound-field generator having an exciter which receives control power from a generator control unit (GCU) 20. Inasmuch as the details of the GCU 20 and the control of the generators 16 are not essential to an understanding of the present invention, they will not be described here.

Figure 3:
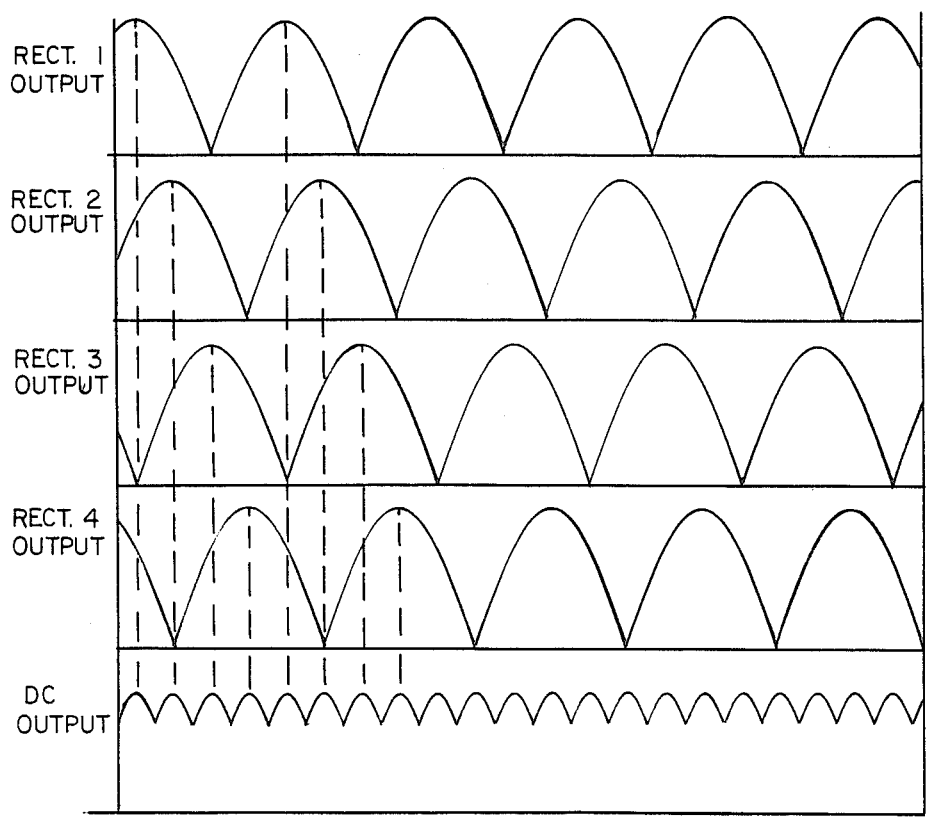
FIG. 3 is a series of waveform diagrams illustrating the operation of the embodiment of FIG. 1 for the case where N=4.

In the embodiment of FIG. 1, the stator windings are physically positioned relative to one another such that the AC voltage developed in each occupies a phase relationship of 360/N electrical degrees with respect to the voltage in the remaining windings. As seen in FIG. 3, such a phase relationship reduces the ripple amplitude in the total DC output and increases the ripple frequency so that it is more easily filtered, if necessary to meet specified limits.

Figure 2:
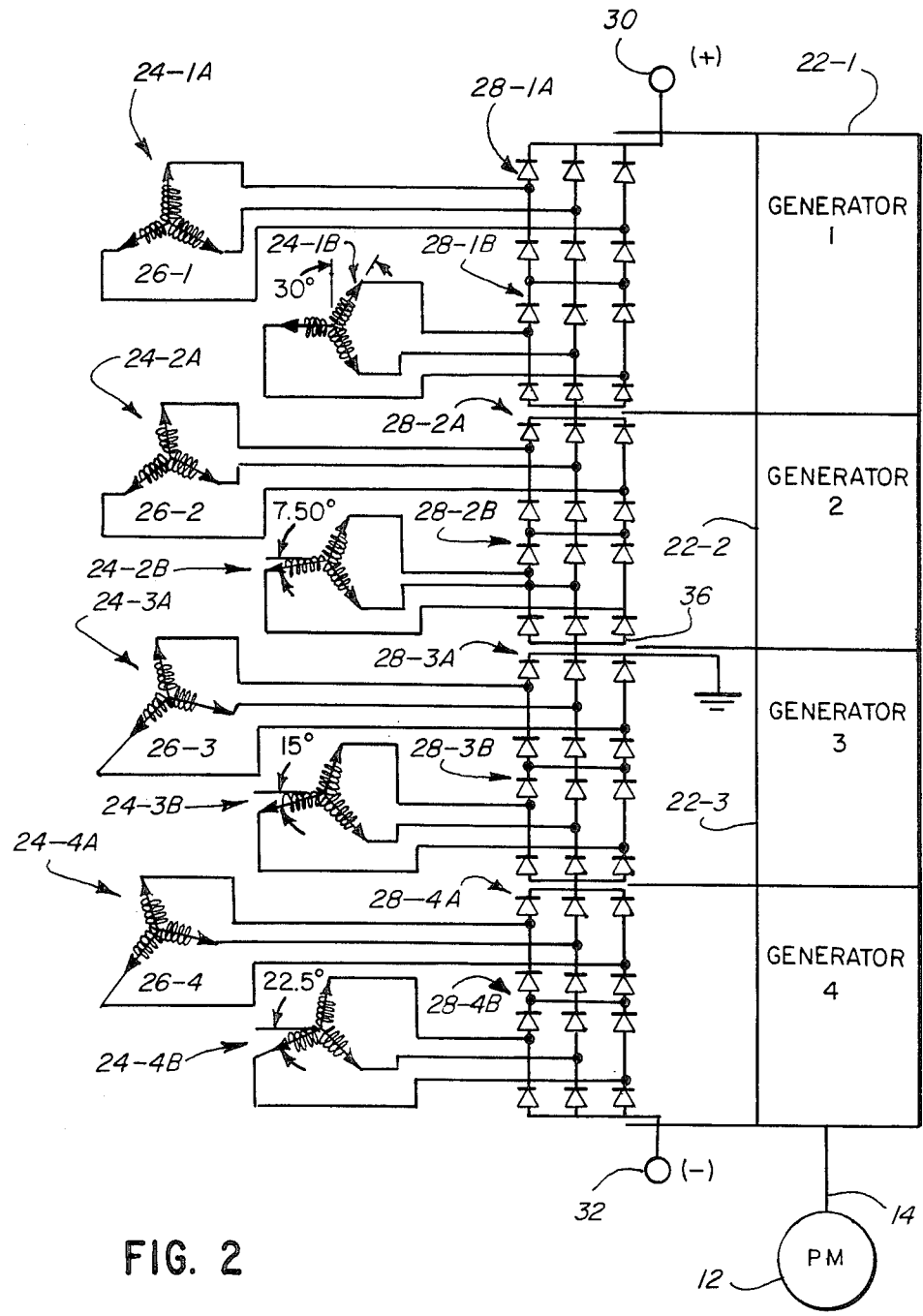
FIG. 2 is a schematic diagram illustrating the armature or stator windings and rectifiers of a preferred embodiment of the present invention.

Referring now to FIG. 2, there is illustrated in schematic form a preferred embodiment of the present invention. The prime mover output shaft 14 is coupled to a series of rotors 22-1 through 22-4 which are shown as being physically joined, although this need not be the case as long as the physical relationship of the rotors is otherwise maintained. Each rotor 22-1 through 22-4 develops a magnetic field in space occupied by a pair of armature or stator winding sets 24-1A and 24-1B, 24-2A and 24-2B, 24-3A and 24-3B or 24-4A and 24-4B, respectively. The winding sets 24-1A, 24-1B and the rotor 22-1, in the preferred embodiment, represent the elements of a first generator 26-1 while the winding sets 24-2A, 24-2B and rotor 22-2 represent a second generator 26-2. Likewise, winding sets 24-3A, 24-3B and rotor 22-3 represent a third generator 26-3 while winding sets 24-4A, 24-4B and rotor 22-4 represent a fourth generator 26-4. As noted in greater detail hereinafter, the number of generators and windings may be different, if desired.

Each winding set 24-1A through 24-4B develops a winding voltage at a fundamental frequency $f_o$ which is coupled to a rectifier 28-1A through 28-4B, respectively, such that each rectifier develops a fractional voltage. The rectifiers are illustrated as full-wave rectifiers although they may alternatively be half-wave rectifiers, as noted previously. The rectifiers 28 are connected together in series so that the fractional voltages are summed to produce the total or combined voltage $V_{DC}$ across all of the rectifiers 28 at terminals 30, 32.

Rotation of the rotors 22 induces AC voltages in the winding sets 24 which, due to the fixed positioning of the rotors 22 relative to one another, are maintained at constant electrical phase displacements. In order to reduce ripple in the output voltage $V_{DC}$ to a minimum, the windings of the sets 24 are physically displaced relative to one another such that there is a total of X equally-spaced ripple peaks for each cycle of each winding voltage. In general, this requirement is expressed by the following equation:

$$X = M \times N \times P \times Z$$

where M is the number of separate winding sets in each generator, N is the number of generators, P is the number of phases in each winding set and Z is equal to 1 or 2 depending upon whether the rectifiers 28 are of the half-wave or full-wave type, respectively.

As should be evident, ripple magnitude decreases as ripple frequency increases. In fact, the equation defining the ratio of the ripple magnitude to the magnitude of the DC output voltage (known as the "ripple factor") is as follows:

$$\text{Ripple Factor} = \frac{\sqrt{2T^2 + T\sin 2T - 4\sin^2 T}}{2\sin T}$$

where
$T = \pi/X$

An analysis of the foregoing equation indicates that ripple frequency is increased (and hence magnitude is decreased) by increasing the value X. This is accomplished by increasing any or all of the values M, N, P, and Z, for example, by using a relatively large number of polyphase winding sets in each machine, using full-wave rectifiers and the like.

The equation defining the required electrical displacement between the voltages induced in corresponding winding sets of successive generators, for example the winding sets 24-1A and 24-2A, is:

$$D_1 = 360/(M \times N \times P \times Z)$$

In the embodiment of FIG. 2, $D_1 = 360/48 = 7.5$ electrical degrees. Thus the electrical displacement between the outputs of the windings of the set 24-1A and 24-2A is 7.5 degrees, as is the displacement between the voltages in the winding sets 24-2A, 24-3A and 24-3A, 24-4A. In other words, the voltage induced in the winding 24-1A is displaced an integer multiple of $D_1$ electrical degrees from the voltage induced in the windings 24-2A, 24-3A and 24-4A where the integer multiple equals 1 through N-1.

The required electrical displacement between the winding voltages of the same generator is:

$$D_2 = 360/(M \times P \times Z)$$

Hence, the voltage in the winding set 28-1B is electrically displaced from the voltage in the winding set 28-1A by $360/12 = 30$ degrees. This displacement also exists between the voltages induced in the windings of the sets 28-2A, 28-2B, the windings of the sets 28-3A, 28-3B and the windings of the sets 28-4A, 28-4B. That is, the voltage in each winding is displaced from the voltage in other windings of the same generator by an integer multiple of $D_2$ electrical degrees, where the integer multiple equals 1 through M-1.

It can be seen for the embodiment shown in FIG. 2 that there is a total of $2 \times 4 \times 3 \times 2 = 48$ ripple peaks or pulses per 360 electrical degrees of each winding output. According to the foregoing equation, the ripple factor for the supply of FIG. 2 is:

Ripple Factor = 0.0005917

This ripple factor is less than 1% which is regarded as being within specified limits. Therefore, no output filtering is necessary and hence overall system size is kept to a minimum.

A particularly advantageous option in the present invention is to connect a midpoint 36 of the rectifiers 28 to ground potential so that the voltages at the terminals 30,32 are at equal magnitudes but opposite polarity. When referenced in this way, the power supply ground insulation requirements are reduced since the maximum voltage to which the ground insulation is exposed is equal to one-half the total output voltage $V_{DC}$. This in turn results in a considerable savings in size and weight.

Further, since each generator 26 develops only a fraction of the total output power, the rotors 22 can be made smaller for a given output power rating. This permits the rotors to be spun at a greater speed, in turn allowing a further reduction in the size and weight of the generators 26. Lesser overall system size and weight is the result.

We claim:

1. A DC generator, comprising:
    N AC generators each having a rotor which develops a magnetic field and a stator having M stator windings, the rotors being mechanically linked to rotate together in response to motive power supplied by a prime mover to thereby induce AC voltages in the $M \times N$ stator windings; and
    $M \times N$ series-connected rectifiers coupled to the outputs of the $M \times N$ stator windings, each rectifier developing a fractional voltage which is added to the fractional voltages developed by the other rectifiers to generate a combined output voltage, wherein the rectifiers include a midpoint connected to ground potential so that the combined output voltage is substantially centered about ground potential;
    whereby the stator windings are physically disposed with respect to one another such that an integer multiple of $M \times N$ equally-spaced ripple peaks appear in the combined output voltage for each 360 degrees in the AC voltage induced in a stator winding.

2. The DC generator of claim 1, wherein the rectifiers may be of either the full-wave or half-wave type and each induced stator winding voltage is displaced an integer multiple of $360/(M \times Z)$ electrical degrees with respect to the induced voltage in the other stator windings of the same generator, where Z equals 1 or 2 depending upon whether the rectifiers are of the half-wave or full-wave type, respectively.

3. The DC generator of claim 2, wherein the rectifiers are of the full-wave type.

4. The DC generator of claim 1, wherein each stator winding of each AC generator corresponds to a stator winding of the other AC generators and wherein the voltage induced in each stator winding is displaced an integer multiple of $360/(M \times N \times Z)$ electrical degrees with respect to the induced voltage in the corresponding stator windings, where Z equals 1 or 2 depending upon whether the rectifiers are of the half-wave or full-wave type, respectively.

5. A DC generator, comprising:
    N AC generators each having a rotor which develops a magnetic field and a stator having M stator winding sets, the rotors being mechanically linked to rotate together in response to motive power supplied by a prime mover to thereby induce AC voltages in the $M \times N$ stator winding sets wherein each stator winding set includes P phase windings; and
    $M \times N$ series-connected rectifiers coupled to the outputs of the $M \times N$ stator winding sets, each rectifier developing a fractional voltage which is added to the fractional voltages developed by the other rectifiers to generate a combined output voltage;
    whereby the stator winding sets are physically disposed with respect to one another such that an integer multiple of $M \times N \times P$ equally-spaced ripple peaks appear in the combined output voltage for each 360° of the AC voltage induced in a phase winding of a winding set.

6. The DC generator of claim 5, wherein the rectifiers may be of either the full-wave or half-wave type and the voltage induced in each phase winding is displaced an integer multiple of $360/(M \times P \times Z)$ electrical degrees with respect to the voltage induced in corresponding phase windings of the same generator, where Z equals 1 or 2 depending upon whether the rectifiers are of the half-wave or full-wave type, respectively.

7. The DC generator of claim 6, wherein the rectifiers are of the full-wave type.

8. The DC generator of claim 5, wherein each phase winding of each winding set corresponds to a phase winding of the other generators and wherein the voltage induced in each phase winding is displaced an integer multiple of $360/(M \times N \times P \times Z)$ electrical degrees with respect to the induced voltage in the corresponding phase windings of the other generators, where Z equals 1 or 2 depending upon whether the rectifiers are of the half-wave or full-wave type, respectively.

* * * * *